ADJUSTABLE SEAT WITH SEAT BELT

Filed Dec. 18, 1963 3 Sheets-Sheet 1

INVENTOR.
EDWARD D. DALL
BY
Barnes, Kisselle, Raisch & Choate
ATTORNEYS

Sept. 21, 1965 E. D. DALL 3,207,554
ADJUSTABLE SEAT WITH SEAT BELT
Filed Dec. 18, 1963 3 Sheets-Sheet 2
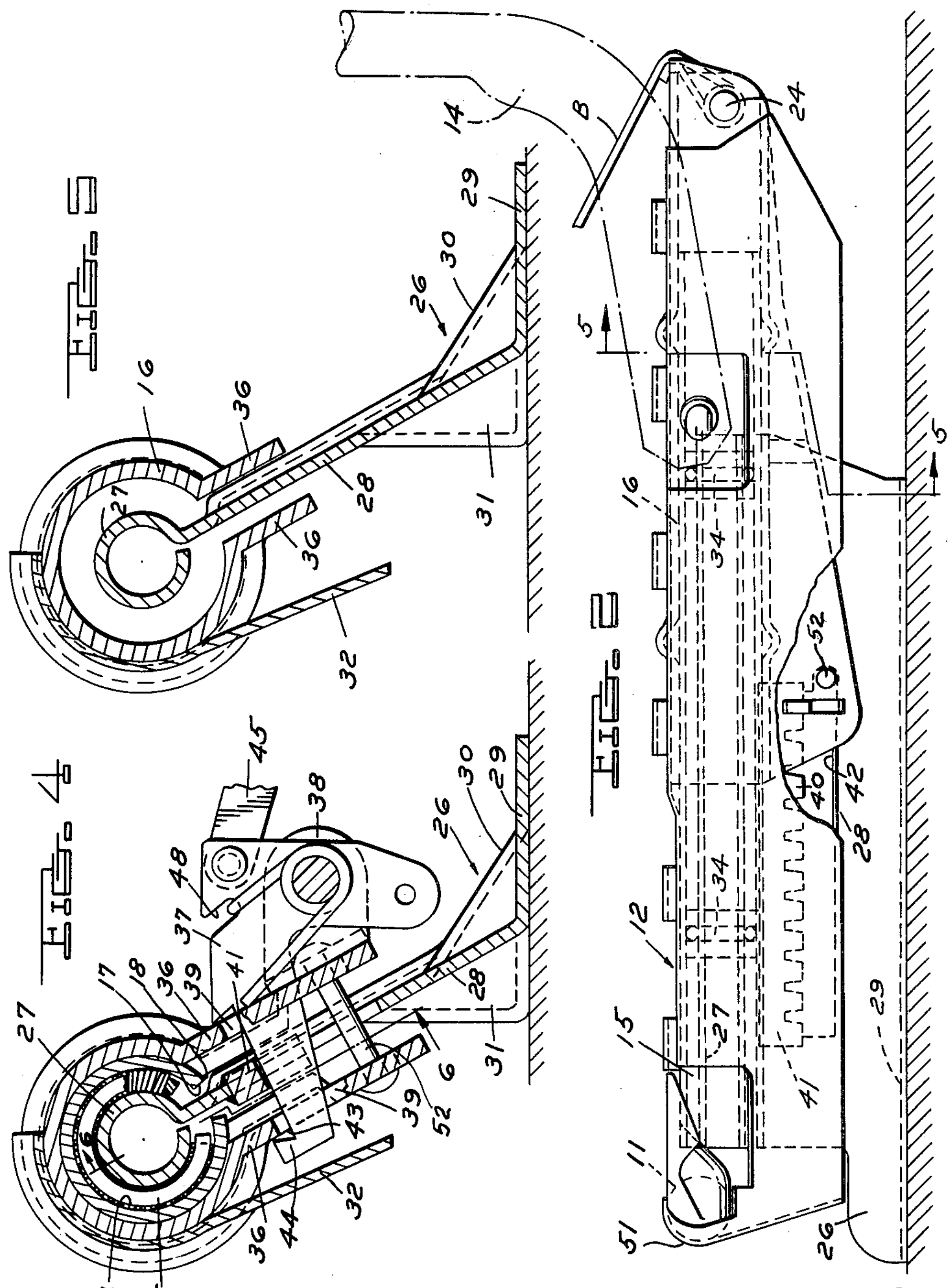
INVENTOR.
EDWARD D. DALL
BY
Barnes, Kisselle, Raisch & Choate
ATTORNEYS Sept. 21, 1965 E. D. DALL 3,207,554
ADJUSTABLE SEAT WITH SEAT BELT
Filed Dec. 18, 1963 3 Sheets-Sheet 3
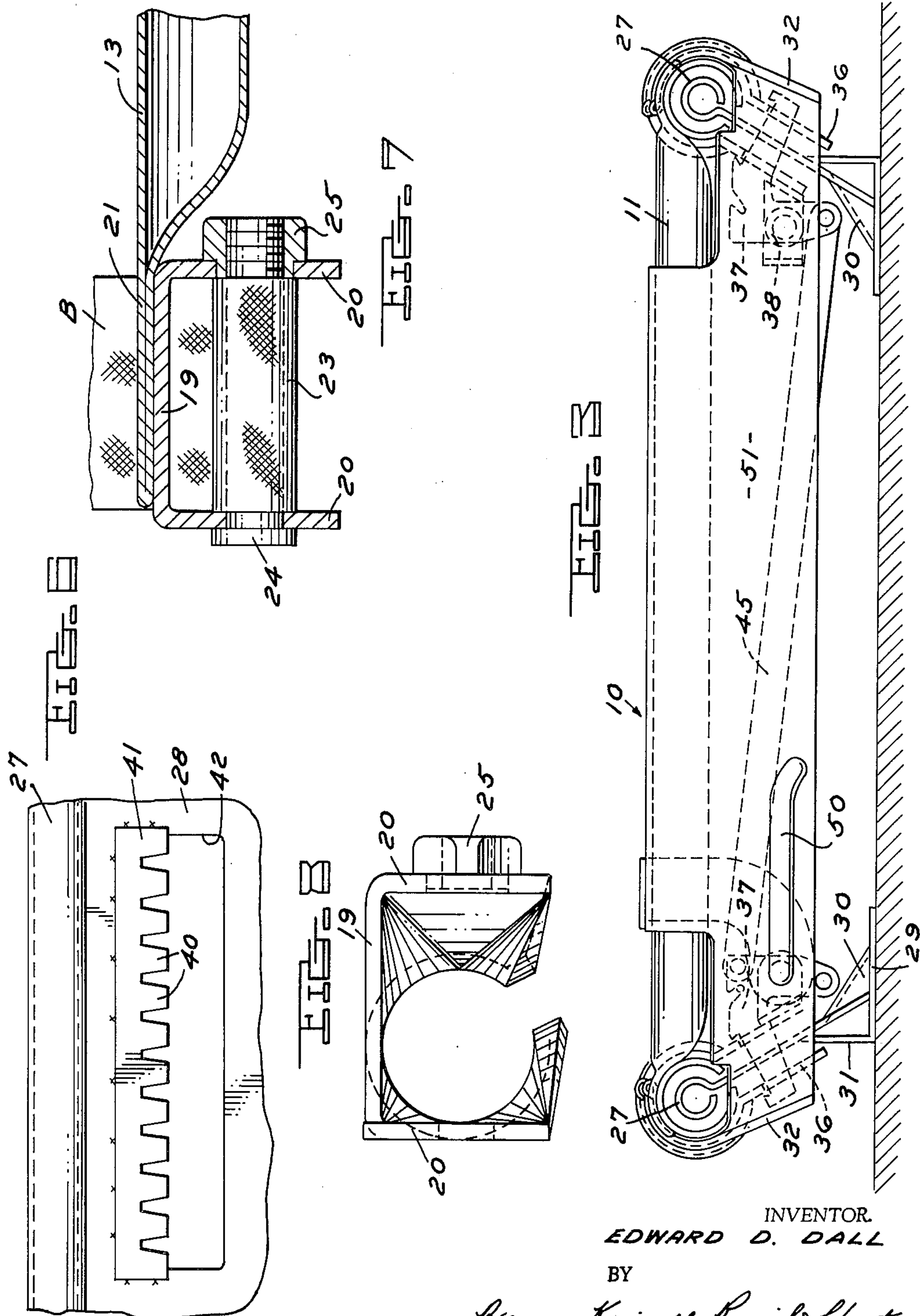
INVENTOR.
EDWARD D. DALL
BY
Barnes, Kisselle, Raisch & Choate
ATTORNEYS 3,207,554
ADJUSTABLE SEAT WITH SEAT BELT
Edward D. Dall, Birmingham, Mich.; Beatrice L. Dall, administratrix of Edward D. Dall, deceased
Filed Dec. 18, 1963, Ser. No. 331,485
18 Claims. (Cl. 297—385)

This invention relates to seats for automotive vehicles and particularly to adjustable seats which utilize seat belts.

At the present time, it is customary to utilize seat belts which are fastened to the vehicle frame. When the seat is to be adjusted, it is necessary for the passenger to unbuckle the seat belts from about the passenger before adjusting the position of the seat.

It is an object of this invention to provide an adjustable seat wherein the seat belts are fastened directly to the seat frame.

It is a further object of the invention to provide such an adjustable seat which meets the standards of strength established for safe automotive use.

In the drawings:

FIG. 2 is a fragmentary right-side elevational view of the seat shown in FIG. 1.

FIG. 3 is a front elevational view of the seat.

FIG. 4 is a fragmentary sectional view taken along the line 4—4 in FIG. 1.

FIG. 5 is a fragmentary sectional view taken along the line 5—5 in FIG. 2.

FIG. 6 is a fragmentary sectional view taken along the line 6—6 in FIG. 4.

FIG. 7 is a fragmentary sectional view taken along the line 7—7 in FIG. 1.

FIG. 8 is an end view of a portion of the seat shown in FIG. 7.

Figure 1:
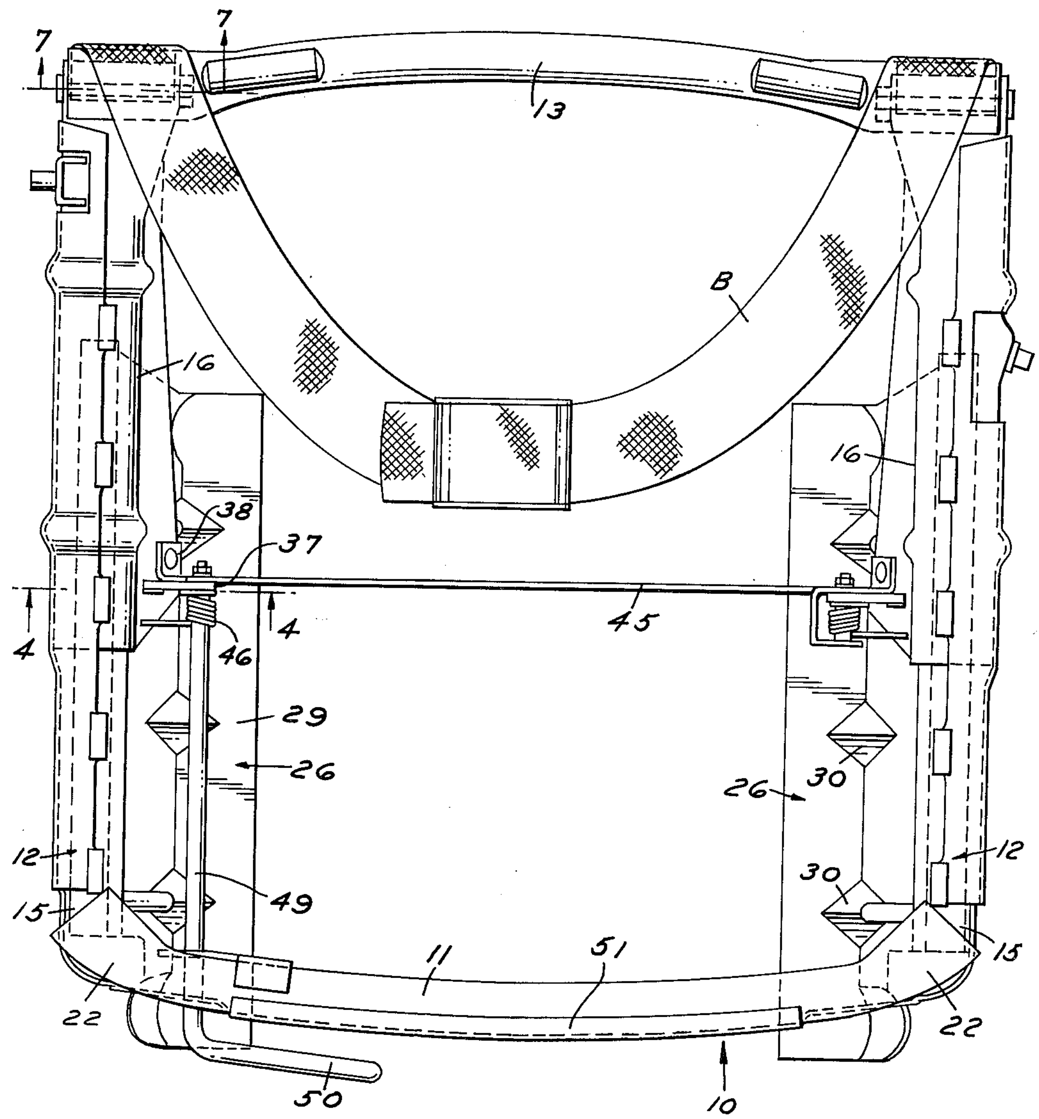
FIG. 1 is a plan view of an adjustable seat embodying the invention, the cushions and springs having been removed.

Referring to FIGS. 1, 2 and 3, seat 10 comprises a seat frame including a tubular front rail 11, tubular side rails 12 and a tubular rear rail 13 which are welded together, as presently described, to form the frame. The frame, in turn, supports the springs and seat cushions or other upholstery. As shown in FIG. 2, the seat back 14 may be fixed or pivoted to the seat frame.

Referring to FIGS. 1–3, each side rail includes a front tubular section 15 and a rear tubular section 16 telescoped over the front section 15 and welded thereto. Each of the sections 15, 16 is formed with a longitudinal slot 17, 18, respectively (FIG. 4), in the underside thereof, the slots 17, 18 being aligned. The rear section 16 of each side rail 12 flares outwardly adjacent its end, as shown in FIGS. 7 and 8, to a substantially inverted U-shaped cross section including a top wall 19 and side walls 20. The ends of the tubular rear rail 13 are flattened as at 21 and welded to the top wall 19 (FIG. 7). The ends of the front rail 11 are flattened as at 22 (FIG. 1) and welded to the ends of the front section 15 of each side rail 12.

As shown in FIG. 7, a bushing 23 extends between the side walls 20 of the rearmost portion of the rear section 16 of each side rail 12 and is held in position by a pin 24 extending through openings in the walls 20 and a nut 25 threaded on the end of the pin. This serves as a support for the end of a seat belt B. The end of the belt B is formed with a loop through which the bushing 23 extends.

In order to provide for adjustment of the seat frame relative to the floor of the vehicle, each side rail is telescoped over a support 26 which is made of one piece and has a tubular upper end 27 over which the tubular side rail 12 is telescoped. An integral web 28 extends downwardly from the tubular support 27 between the slots 17, 18 of the sections 15, 16 of each side rail 12 to a base portion 29 which is fastened to the floor of a vehicle by any suitable means. Reinforcing webs 30, 31 are provided to strengthen the support of the web 28 by the base portion 29.

As shown in FIGS. 3, 4 and 5, the webs 28 preferably extend upwardly and outwardly relative to the floor in order to provide greater strength, lessen the height as of the seat frame relative to the floor of the vehicle, and minimize the overhang of parts on the side of the seat frame. By this arrangement, decorative side skirts 32 mounted on side rails 12 can extend downwardly and inwardly.

As shown in FIG. 2, roller bearing assemblies 34 are provided at longitudinally spaced points between the inner surface of the side rails 12 and the outer surface of the tubular support 27. The roller bearing assemblies are of the general type shown in my Patent No. 3,007,668, issued November 7, 1961, and comprise tightly wound springs 34 positioned in the slots of generally cylindrical guides 35 which guide the roller bearings independently of the tubular support and tubular side rail. The guides 35 are preferably made of a low friction plastic material, such as Delrin, and have a thickness slightly less than the diameter of the springs.

Referring to FIGS. 2 and 4, the rear section 16 of each side rail 12 which is telescoped over the front section 15 has, in the overlapping portion thereof, a pair of flanges 36 which extend downwardly generally parallel to the web 28 from the sides of the slot 18 in the section 16. A latch 37 is pivoted to a bracket 38 on the innermost flange 36 and extends through slots 39 in the flanges for engagement with one of a plurality of longitudinally spaced teeth 40 in the web 28. The teeth 40 are preferably formed on an insert 41 welded in the upper end of a slot 42 in the web 28. Latch 37 includes a notch 43 having inclined ends 44 which tend to dig into the sides of the flanges 36 if an excessive upward load is placed on the side rail 12 and thereby prevent the slots 17 and 18, in sections 15 and 16 of side rail 12, from spreading open.

Referring to FIG. 1, the latches 37 on each side rail 12 are interconnected by a rod 45 and are yieldingly urged into engagement with their respective teeth by springs 46 which have one end thereof engaging the bracket and the other end thereof engaging a slot 48 in the latch. One of the latches is operated by a rod 49 which has a handle 50 journalled on the decorative skirt 51 which is mounted on the front rail 11 of the seat. When handle 50 is rotated, one of the latches 37 is operated which, in turn, operates the other latch 37 through rod 45 to move the latches 47 away from the teeth 40.

As shown in FIGS. 2 and 4, a rivet 52 extends between the flange 36 to further oppose any tendency of the sections 15, 16 to spread open.

It has been found that when tested, the adjustable seat embodying the invention withstands upward loads on the seat, such as would be provided by a person fastened in with the seat belt B, far in excess of any strength requirements heretofore established in the automotive industry.

I claim:

1. In a seat, the combination comprising
a seat frame including a front structural rail,
structural side rails,
and a structural rear rail,
means for fastening the front end of said side rails to the front rail,
each said side rail including a first tubular portion adjacent the forward end thereof and a second tubular portion adjacent the rear end thereof,
said second portion flaring outwardly rearwardly into a substantially U-shaped cross section including a top wall and side walls, said rear rail being welded to said flared portions of said side rails, means extending transversely between the side walls of the rear portion of each said side rail, a seat belt connected at one end to each said last-mentioned means and extending rearwardly outwardly and upwardly, said seat belts being adapted to be fastened to one another at their other ends, each said side rail being slotted and having parallel flanges extending downwardly from the edges of said slot, a support adapted to be fastened to the floor of a vehicle and including a tubular upper portion telescoped within the side rail and a web extending downwardly from a tubular portion between the flanges of said side rail, bearing means positioned at longitudinally spaced points within said side rail between the side rail and said tubular portion of said support, said web portion of said tubular support having a cut-out portion and including a plurality of longitudinally spaced teeth, a latch, said flanges of each said side rail having slots therein through which the latch extends, and means for pivoting the latch to said side rail for movement into and out of engagement with one of said teeth.

2. The combination set forth in claim 1 wherein each said side rail comprises two sections welded to one another, said sections being partially telescoped, said flanges extending downwardly from the outer section in the area of said telescoping relation of said two sections.

3. The combination set forth in claim 1 wherein the ends of each said rear rail are flattened and overlie the top wall of the U-shaped portion of each said side rail.

4. The combination set forth in claim 1 wherein said flanges include first areas in parallel spaced relation and second areas in parallel spaced relation more closely than said first areas.

5. The combination set forth in claim 1 wherein said web of said support on each side of said seat extends upwardly and outwardly.

6. The combination set forth in claim 1 wherein said bearing means comprises a plastic generally cylindrical guide member having a longitudinal slot therein, and at least one tightly wound spring in said slot, the thickness of said plastic guide member being substantially equal to the distance between the inner wall of said tubular side rail and the outer wall of said tubular support and the diameter of said spring.

7. The combination set forth in claim 1 wherein said latch includes a cut-out portion, the edges of said cut-out portion extending inwardly.

8. The combination set forth in claim 1 wherein said bearing means comprise roller bearing members and means for holding said roller bearing members transversely of said side rails and guiding said members independently of said side rails and said supports.

9. In a seat, the combination comprising a seat frame including a front structural rail, structural side rails, and a structural rear rail, means for fastening the front end of said side rails to the front rail, each said side rail including a first tubular portion adjacent the forward end thereof and a second tubular portion adjacent the rear end thereof;

said second portion flaring outwardly rearwardly into a substantially U-shaped cross section including a top wall and side walls, said rear rail being welded to said flared portions of said side rails, a pin extending transversely between the side walls of the rear portion of each said side rail for attachment of a seat belt, a support adapted to be fastened to the floor of a vehicle and including a tubular upper portion telescoped within the side rail and a web extending downwardly from said tubular portion between the flanges of said side rail, bearing means positioned at longitudinally spaced points within said side rail between the side rail and said tubular portion of said support, and means extending between each said side rail and its respective support for locking said side rails in adjusted position.

10. The combination set forth in claim 9 wherein said side rail comprises two sections welded to one another, said sections being partially telescoped, and flanges extending downwardly from the outer section in the area of said telescoping relation of said two sections, said locking means extending between said flanges and said web of said support.

11. The combination set forth in claim 10 wherein said flanges include first areas in parallel spaced relation and second areas in parallel spaced relation more closely than said first areas.

12. The combination set forth in claim 9 wherein the ends of each said rear rail are flattened and overlie the top wall of the U-shaped portion of each said side rail.

13. The combination set forth in claim 9 wherein said web of said support on each side of said seat extends upwardly and outwardly.

14. The combination set forth in claim 9 wherein said bearing means comprises a plastic generally cylindrical guide member having a longitudinal slot therein, and at least one tightly wound spring in said slot, the thickness of said plastic guide member being substantially equal to the distance between the inner wall of said tubular side rail and the outer wall of said tubular support and the diameter of said spring.

15. In a seat, the combination comprising a seat frame including a front structural rail, structural side rails, and a structural rear rail, means for fastening the front end of said side rails to the front rail, each said side rail including a first tubular portion adjacent the forward end thereof and a second tubular portion adjacent the rear end thereof, said second portion flaring outwardly rearwardly into a substantially U-shaped cross section including a top wall and side walls, said rear rail being welded to said flared portions of said side rails, a pin extending transversely between the side walls of the rear portion of each said side rail, a seat belt connected at one end to each said pin and extending rearwardly outwardly and upwardly, said seat belts being adapted to be fastened to one another at their other ends, each said side rail being slotted and having parallel flanges extending downwardly from the edges of said slot, a support adapted to be fastened to the floor of a vehicle and including a tubular upper portion telescoped within the side rail and a web extending downwardly from a tubular portion between the flanges of said side rail, bearing means positioned at longitudinally spaced points within said side rail between the side rail and said tubular portion of said support, said web portion of said tubular support having a cutout portion and including a plurality of longitudinally spaced teeth, said flanges of each said side rail having slots therein through which a latch extends, and means for pivoting the latch to said side rail for movement into and out of engagement with one of said teeth.

16. In a vehicle seat, the combination comprising a seat frame including a front structural rail, structural side rails, and a structural rear rail, each said side rail being generally tubular and having a slot in the underside thereof extending longitudinally thereof, a support individual to each said side rail adapted to be fastened to the floor of a vehicle and including a tubular upper portion telescoped within a side rail, bearing means between said side rails and their respective supports, each said side rail having flange portions extending downwardly from the sides of said slot, and means interconnecting said flange portions for preventing said side rails from opening up under extreme upward pressures on the side rails.

17. In a vehicle seat, the combination comprising a seat frame including a front structural rail, structural side rails, and a structural rear rail, each said side rail being generally tubular and having a slot in the underside thereof extending longitudinally thereof, a support individual to each said side rail adapted to be fastened to the floor of a vehicle and including a tubular upper portion telescoped within a side rail, bearing means between said side rails and their respective supports, and means for preventing each said side rail from opening at its respective slot under extreme pressure, said means being operable without interference with the longitudinal movement of the side rail relative to its respective support.

18. In a vehicle seat, the combination comprising a seat frame including a front structural rail, structural side rails, and a structural rear rail, each said side rail being generally tubular and having a slot in the underside thereof extending longitudinally thereof, a support individual to each said side rail adapted to be fastened to the floor of a vehicle and including a tubular upper portion telescoped within a side rail, bearing means between said side rails and their respective supports, each said support having an integral web extending upwardly through the slot of its respective side rail, each said web extending upwardly and outwardly relative to the floor of a vehicle.

References Cited by the Examiner

UNITED STATES PATENTS

| | | | |
|---|---|---|---|
| 2,312,030 | 2/43 | Cramer | 297—383 X |
| 2,676,858 | 4/54 | Duncan | 308—3.6 |
| 2,757,051 | 7/56 | Wilmer | 308—3.6 |
| 2,840,139 | 6/58 | Ragsdale | 308—6 |
| 2,947,353 | 8/60 | Wimmersperg | 297—388 |

FRANK B. SHERRY, *Primary Examiner.*